United States Patent
Johansson et al.

(10) Patent No.: US 9,114,708 B2
(45) Date of Patent: Aug. 25, 2015

(54) METHOD AND MODULE FOR DETERMINING OF REFERENCE VALUES FOR A VEHICLE CONTROL SYSTEM

(75) Inventors: Oskar Johansson, Stockholm (SE); Maria Södergren, Segeltorp (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/365,331

(22) PCT Filed: Dec. 22, 2011

(86) PCT No.: PCT/SE2011/051578
§ 371 (c)(1),
(2), (4) Date: Jun. 13, 2014

(87) PCT Pub. No.: WO2013/095239
PCT Pub. Date: Jun. 27, 2013

(65) Prior Publication Data
US 2014/0350819 A1 Nov. 27, 2014

(30) Foreign Application Priority Data
Dec. 22, 2011 (SE) .................................... 1151259-7

(51) Int. Cl.
*B60W 30/14* (2006.01)
*G01C 21/32* (2006.01)
(Continued)

(52) U.S. Cl.
CPC .............. *B60K 31/00* (2013.01); *G05B 13/048* (2013.01); *B60K 2310/244* (2013.01); *B60W 2550/402* (2013.01); *G05B 13/026* (2013.01); *Y02T 10/84* (2013.01)

(58) Field of Classification Search
CPC ...... B60W 30/14; B60W 40/06; B60K 31/00; G05B 13/04; G01C 21/32; G01C 21/34; G08G 1/0968; F02D 35/00
USPC ............ 701/93, 54, 65, 409, 454; 340/995.19
See application file for complete search history.

(56) References Cited

U.S. PATENT DOCUMENTS 5,931,886 A * 8/1999 Moroto et al. ................... 701/54
6,098,005 A * 8/2000 Tsukamoto et al. ............ 701/65
(Continued)

FOREIGN PATENT DOCUMENTS

DE 10 2009 030 784 A1 2/2010
DE 10 2008 035 944 A1 4/2010
(Continued)

OTHER PUBLICATIONS

International Search Report mailed Sep. 7, 2012 in corresponding PCT International Application No. PCT/SE2011/051578.
(Continued)

Primary Examiner — Tan Q Nguyen
(74) Attorney, Agent, or Firm — Ostrolenk Faber LLP

(57) ABSTRACT

Reference speed values for a vehicle's control system are determined by: determining, using map and location data, route segments, each with route characteristics; performing, simulation cycles, each comprising simulation steps of: predicting the speed when the set speed is imparted as the reference speed; comparing with first lower and upper limit values, which define an engine torque, for use in the next simulation cycle; making a second prediction of the speed when the engine torque is a value that depends on the result of said first comparison in the immediately preceding simulation cycle; comparing the second predicted vehicle speed with second lower and upper limit values, which delineate a range within which the speed is maintained, with an offset added if the vehicle is in a route segment with a steep hill; and determining the reference value based on the second comparison and/or the second predicted vehicle speed.

24 Claims, 4 Drawing Sheets

(51) Int. Cl.
*G05B 13/04* (2006.01)
*B60K 31/00* (2006.01)
*G05B 13/02* (2006.01)

(56) References Cited

U.S. PATENT DOCUMENTS

| | | | |
|---|---|---|---|
| 6,782,961 B1 * | 8/2004 | Ishikawa et al. | 180/197 |
| 2005/0096183 A1 | 5/2005 | Watanabe et al. | 477/182 |
| 2007/0265759 A1 | 11/2007 | Salinas et al. | 701/93 |
| 2010/0198450 A1 | 8/2010 | Shin | 701/29 |
| 2014/0277971 A1 * | 9/2014 | Oshiro et al. | 701/51 |

FOREIGN PATENT DOCUMENTS

| | | |
|---|---|---|
| DE | 10 2010 003 428 A1 | 10/2011 |
| GB | 2480877 A | 12/2011 |
| WO | WO 2010/144028 A1 | 12/2010 |
| WO | WO 2010/144030 A1 | 12/2010 |

OTHER PUBLICATIONS

Erik Hellström et al., "Look-ahead control for heavy trucks to minimize trip time and fuel consumption," Control Engineering Practice, 17(2):245-254, 2009.

* cited by examiner

METHOD AND MODULE FOR DETERMINING OF REFERENCE VALUES FOR A VEHICLE CONTROL SYSTEM

CROSS-REFERENCE TO RELATED APPLICATIONS

The present application is a 35 U.S.C. §§371 national phase conversion of PCT/SE2011/051578, filed Dec. 22, 2011, which claims priority of Swedish Application No. 1151259-7, filed Dec. 22, 2011. The contents of both applications are incorporated by reference herein. The PCT International Application was published in the English language.

FIELD OF THE INVENTION

The present invention relates to a method and a module for determining at least one reference value according to the present disclosure.

BACKGROUND TO THE INVENTION

Cruise control is now usual in motor vehicles, e.g. cars, trucks and buses. An object of cruise control is to achieve a uniform predetermined speed. This is done either by adjusting the engine torque to avoid retardation, or by applying braking action on downhill runs where the vehicle is accelerated by its own weight. A more general object of cruise control is to provide convenient driving and better comfort for the vehicle's driver. A driver of a vehicle equipped with cruise control usually chooses a set speed $v_{set}$ as the speed he/she wishes the vehicle to maintain on level roads. A cruise control then supplies an engine system of the vehicle with a reference speed $v_{ref}$ used for control of the engine. The set speed $v_{set}$ may thus be regarded as an input signal to the cruise control, whereas the reference speed $v_{ref}$ may be regarded as an output signal from the cruise control and is used for control of the engine.

Today's traditional cruise control (CC) maintains a constant reference speed $v_{ref}$ usually set by the vehicle's driver in the form of a set speed $v_{set}$ which is thus here a desired speed chosen for example by him/her, and for today's conventional cruise controls the reference speed is constant and equal to the set speed, i.e. $v_{ref}=v_{set}$. The value of the reference speed $v_{ref}$ changes only when adjusted by the driver while the vehicle is in motion. The reference speed $v_{ref}$ is then sent to a control system which controls the vehicle so that its speed corresponds when possible to the reference speed $v_{ref}$. If the vehicle is equipped with an automatic gearchange system, the gears may be changed by that system on the basis of the reference speed $v_{ref}$ to enable the vehicle to maintain the reference speed $v_{ref}$, i.e. to enable it to maintain the desired set speed $v_{set}$.

In hilly terrain, the cruise control system will try to maintain the set speed vset uphill and downhill. This may result inter alia in the vehicle accelerating over the crest of a hill and into a subsequent downgrade. It will then need to be braked to avoid exceeding the set speed $v_{set}$ or will reach a speed $v_{kfb}$ at which the constant speed brake is activated, which is a fuel-expensive way of driving the vehicle. It may also need to be braked downhill to avoid exceeding the set speed $v_{set}$ or the constant speed brake's activation speed $v_{kfb}$ in cases where the vehicle does not accelerate over the crest of the hill.

To reduce fuel consumption, especially on hilly roads, economical cruise controls such as Scania's Ecocruise® have been developed. This cruise control tries to estimate the vehicle's current running resistance and also has information about its historical running resistance. The economical cruise control may also be provided with map data comprising topographical information. The vehicle is then located on the map, e.g. by means of GPS, and the running resistance along the road ahead is estimated. The vehicle's reference speed $v_{ref}$ can thus be optimised for different types of roads in order to save fuel, in which case the reference speed $v_{ref}$ may differ from the set speed $v_{set}$. This specification refers to cruise controls which allow the reference speed $v_{ref}$ to differ from the set speed $v_{set}$ chosen by the driver, i.e. reference speed-regulating cruise controls.

An example of a further development of an economical cruise control is a "look ahead" cruise control (LACC), a strategic form of cruise control which uses knowledge of sections of road ahead, i.e. knowledge of the nature of the road ahead, to determine the reference speed $v_{ref}$. LACC is thus an example of a reference speed-regulating cruise control whereby the reference speed $v_{ref}$ is allowed, within a certain range ($v_{min}$, $v_{max}$), to differ from the set speed $v_{set}$ chosen by the driver, in order to achieve more fuel saving.

Knowledge of the road section ahead may for example comprise information about prevailing topology, road curvature, traffic situation, roadworks, traffic density and state of road. It may further comprise a speed limit on the section ahead, and a traffic sign beside the road. Such knowledge is for example available from location information, e.g. GPS (global positioning system) information, map information and/or topographical map information, weather reports, information communicated between vehicles and information provided by radio. All this knowledge may be used in a variety of ways. For example, information about a speed limit on the road ahead may be used to achieve fuel efficiency by lowering the vehicle's speed before reaching a lower speed limit. Similarly, knowledge of a road sign which indicates for example a roundabout or intersection ahead may also be used to achieve fuel efficiency by braking before the vehicle reaches the roundabout or intersection.

An LACC cruise control does for example make it possible, before a steep upgrade, for the reference speed $v_{ref}$ to be raised to a level above the set speed $v_{set}$, since the vehicle will be expected to lose speed on such a climb owing to high train weight relative to engine performance. Similarly, before a steep downgrade, the LACC cruise control makes it possible for the reference speed $v_{ref}$ to be lowered to a level below the set speed $v_{set}$, since the vehicle will be expected (predicted) to accelerate on such a downgrade owing to its high train weight. The concept here is that reducing the speed at which the vehicle begins the downhill run makes it possible to reduce the energy braked away and/or the air resistance losses (as reflected in the amount of fuel injected before the downgrade). The LACC cruise control may thus reduce fuel consumption without substantially affecting journey time.

Such cruise control systems can be made robust if the topography ahead is made known by the vehicle having map data and GPS. The cruise control system may also alter the vehicle's speed proactively, i.e. before situations arise.

A vehicle usually has a number of ECUs (electronic control units) which control various electronic systems of the vehicle. The vehicle's engine is often controlled by an ECU of its own, called EMS (engine management system). A cruise control's logic may be situated in the EMS but this is sometimes not possible where the EMS has insufficient memory capacity and/or already has a high processor load. If the cruise control's logic is situated in some other ECU than the EMS, reference values, e.g. a desired reference speed $v_{ref}$, have to be sent via CAN (controller area network) to the engine control system's regulator, which then regulates the vehicle's speed on the reference speed $v_{ref}$.

A traditional PID regulator works on the basis of a reference speed $v_{ref}$ received. When this reference speed $v_{ref}$ is altered by the cruise control's logic and is sent via CAN, it is the PID regulator in the engine control system which regulates the vehicle speed towards the reference speed $v_{ref}$. The cruise control logic predicts the vehicle's speed but the regulator in the engine control system tries at the same time to regulate the vehicle's speed, which can lead to problems. It may for example result in maximum torque not being ordered by the engine system at the beginning of a climb despite the cruise control logic having catered for it in the prediction of the reference speed $v_{ref}$. There is therefore risk that the regulator may regulate the engine system with a gradually increasing error.

US 2005/0096183 refers to a speed regulator for a vehicle travelling downhill. The hills concerned are described as having a particular downward gradient, and when the driver operates a gradient switch a constant speed is set for the vehicle for as long as the switch is on. A constant speed is thus set when the driver indicates that the vehicle is on a hill.

U.S. Pat. No. 6,076,036 bases cruise control on a speed setting, the vehicle's current speed, an acceleration and a change in the gradient of the road, which is measured by a sensor, in order to set the fuel flow for lower fuel consumption.

SUMMARY OF THE DISCLOSURE

The object of the present invention is to propose improved cruise control of a vehicle when its speed is to be predicted by the cruise control logic and is at the same time to be regulated by the regulator, and in particular to avoid fuel being unnecessarily injected into the engine because of an unstable control signal to the engine control system.

According to an aspect of the present invention, the object described above is at least partly achieved by applying the aforesaid method, which is characterised by:
  acquiring a set speed $v_{set}$ for the vehicle;
  determining a horizon for the itinerary by means of map data and location data, which horizon comprises one or more route segments with at least one characteristic for each segment;
  performing, during each of a number of simulation cycles $s_j$ each comprising a number N of simulation steps conducted at a predetermined rate f, the steps of:
    making a first prediction of the vehicle's speed $v_{pred\_cc}$ along the horizon according to a conventional cruise control when the set speed $v_{set}$ is imparted as a reference speed $v_{ref}$, which first prediction depends on the characteristics of said route segment;
    doing a first comparison of the first predicted vehicle speed $v_{pred\_cc}$ with at least one of first lower and upper limit values $v_{lim1}$ and $v_{lim2}$ which are used to define an engine torque T for use in the next simulation cycle $s_{j+1}$;
    making a second prediction of the vehicle's speed $v_{pred\_Tnew}$ along the horizon when the vehicle's engine torque T is a value which depends on the result of said first comparison in the immediately preceding simulation cycle $s_{j-1}$;
    doing a second comparison of the second predicted vehicle speed $v_{pred\_Tnew}$ with at least one of second lower and upper limit values $v_{min}$ and $v_{max}$ which delineate a range within which the vehicle's speed should be, including an offset $v_{offset}$ added to at least one of said second lower and upper limit values $v_{min}$ and $v_{max}$ if the vehicle is in a route segment which comprises a steep hill; and
    determining at least one reference value along the horizon which indicates how the vehicle's speed is to be influenced, on the basis of said second comparison and/or the second predicted vehicle speed $v_{pred\_Tnew}$ in this simulation cycle $s_j$; and
  using in a control system of the vehicle said at least one reference value on which the vehicle is then regulated.

According to an aspect of the present invention, the object described above is at least partly achieved by using the aforesaid module, which is characterised by:
  an input unit adapted to receiving a set speed $v_{set}$ for the vehicle;
  a horizon unit adapted to determining a horizon for the itinerary by means of map data and location data which comprise route segments with at least one characteristic for each segment;
  a calculation unit adapted to performing, during each of a number of simulation cycles $s_j$ each comprising a number N of simulation steps conducted at a predetermined rate f, the steps of:
    making a first prediction of the vehicle's speed $v_{pred\_cc}$ along the horizon according to a conventional cruise control when the set speed $v_{set}$ is imparted as a reference speed $v_{ref}$, which first prediction depends on the characteristics of said route segment;
    doing a first comparison of the first predicted vehicle speed $v_{pred\_cc}$ with at least one of first lower and upper limit values $v_{lim1}$ and $v_{lim2}$ which are used to define an engine torque T for use in the next simulation cycle $s_{j+1}$;
    making a second prediction of the vehicle's speed $v_{pred\_Tnew}$ along the horizon when the vehicle's engine torque T is a value which depends on the result of said first comparison in the immediately preceding simulation cycle $s_{j-1}$;
    doing a second comparison of the second predicted vehicle speed $v_{pred\_Tnew}$ with at least one of second lower and upper limit values $v_{min}$ and $v_{max}$ which delineate a range within which the vehicle's speed should be, including an offset $v_{offset}$ added to at least one of said second lower and upper limit values $v_{min}$ and $v_{max}$ if the vehicle is in a route segment which comprises a steep hill; and
    determining at least one reference value along the horizon which indicates how the vehicle's speed is to be influenced, on the basis of said second comparison and/or the second predicted vehicle speed $v_{pred\_Tnew}$ in this simulation cycle $s_j$; and
  a providing unit adapted to supplying a control system of the vehicle with said at least one reference value on which the vehicle is then regulated.

The invention provides assurance of correct speed set-point values (reference values) being imparted to the regulator to enable it to follow the prediction of the vehicle's speed. Maximum assurance may thus be afforded of available engine torque on steep upgrades and zero torque/drag torque on steep downgrades. This means that the regulating error affecting the regulator on steep upgrades is sufficient at the beginning of the climb for the engine to be able to deliver maximum torque at that stage in order to avoid the vehicle's speed dropping more than necessary. On steep downhill runs, low constant speed set-point values are provided to be able to avoid injecting fuel into the engine.

The invention also provides a way of improving the performance of a distributed regulating system in which traditional methods of directly influencing the regulator, e.g. disconnection or stronger regulator parameters, are not easy to apply because the set-point value generator and the regulator are situated in different control units.

The invention also affords the advantage of preventing a vehicle's speed from increasing at the crest of a hill in order to reach the vehicle's reference speed before an ensuing downhill run. This speed increase at the crest of a hill generally causes unnecessary cost.

The invention thus achieves consistent regulation of the vehicle's speed, i.e. no lowering of speed followed by a speed increase at the crest of a hill.

Preferred embodiments are described herein.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
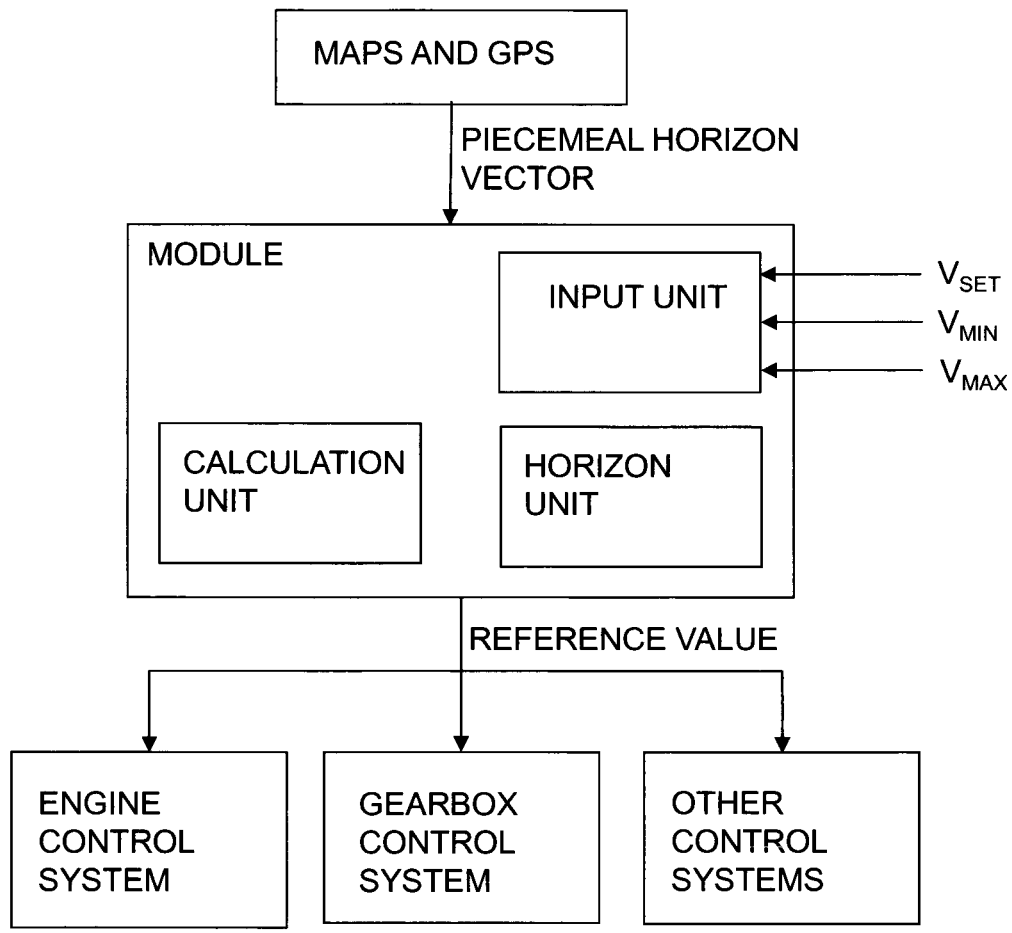
FIG. 1 depicts a module according to an embodiment of the invention.

FIG. 1 depicts a module for controlling a vehicle's speed according to an aspect of the invention. The module comprises an input unit adapted to receiving a desired speed, i.e. a set speed $v_{set}$, for the vehicle. The driver may for example set a speed $v_{set}$ which he/she wishes the vehicle to maintain. The input unit may also be adapted to receiving input values for the second lower limit value $v_{min}$ and the second upper limit value $v_{max}$. The module comprises also a horizon unit adapted to determining a horizon H for the itinerary by means of map data and location data. The horizon H is made up of route segments with at least one characteristic for each segment. A possible example of the characteristics of route segments is their gradient α, in radians.

The description of the present invention states that GPS (global positioning system) is used to determine location data for the vehicle, but specialists will appreciate that other kinds of global or regional positioning systems are conceivable to provide these data. Such positioning systems might for example use radio receivers to determine the vehicles location. The vehicle might also use sensors to scan the surroundings and thereby determine its location.

FIG. 1 illustrates how the module is provided with information about the itinerary from maps (map data) and GPS (location data). The itinerary is sent to the module bit by bit, e.g. via CAN (controller area network) bus. The module may be separate from or be part of the one or more control systems which are to use reference values for regulating. An example of such a control system is the vehicle's engine control system. The control system may also be any other appropriate control system of the vehicle, e.g. cruise control, gearbox control system or other control systems. For example, a horizon is put together for each control system, since the control systems regulate on different parameters. Alternatively, the unit which handles maps and positioning systems may also be part of a system which is to use reference values for regulating. In the module, the bits of the itinerary are then put together in a horizon unit to construct a horizon and are processed by the processor unit to create an internal horizon on which the control system can regulate. The horizon is then continually supplemented by new bits of itinerary from the unit with GPS and map data, to maintain a desired length of horizon. The horizon is thus updated continuously when the vehicle is in motion.

CAN is a serial bus system specially developed for use in vehicles. The CAN data bus makes digital data exchange possible between sensors, regulating components, actuators, control devices etc., and provides assurance that two or more control devices can have access to the signals from a given sensor in order to use them to control components connected to them. Each of the connections between the units illustrated in FIG. 1 may take the form of one or more from among a cable, a data bus, e.g. a CAN (controller area network) bus, an MOST (media orientated systems transport) bus, or some other bus configuration, or a wireless connection.

The module comprises also a calculation unit adapted to, during a number of simulation cycles $s_j$ each comprising a number N of simulation steps which are conducted at a predetermined rate f, in each simulation cycle make a first prediction of the vehicle's speed $v_{pred\_cc}$ along the horizon according to a conventional cruise control when the desired speed $v_{set}$ is imparted as a reference speed $v_{ref}$, which first prediction depends on the characteristics of said route segment. A first comparison is also done between the first predicted vehicle speed $v_{pred\_cc}$ and first lower and upper limit values $v_{lim1}$ and $v_{lim2}$ which are used to define an engine torque T for use in the next simulation cycle $s_{j+1}$.

A second prediction of the vehicle speed $v_{pred\_Tnew}$ along the horizon is then made on the basis of a vehicle engine torque T which depends on the result of said first comparison in the immediately preceding simulation cycle $s_{j-1}$. This simulation cycle $s_j$ thus here uses the first comparison in the preceding simulation cycle $s_{j-1}$ when the second prediction of the vehicle speed $v_{pred\_Tnew}$ is made in this simulation cycle $s_j$.

In a second comparison, the second predicted vehicle speed $v_{pred\_Tnew}$ Tnew is then compared with second lower and upper limit values $v_{min}$ and $v_{max}$ which delineate a range within which the vehicle's speed should be.

This is followed by determining at least one reference value which indicates how the vehicle's speed is to be influenced on the basis of said second comparison and/or the second predicted vehicle speed $v_{pred\_Tnew}$ in this simulation cycle $s_j$. According to the present invention, an offset $v_{offset}$ is added to at least one of said second lower and upper limit values $v_{min}$ and $v_{max}$ if the vehicle is in a route segment which comprises a steep hill. How this offset $v_{offset}$ is determined and added to limit values according to various embodiments of the invention will be described in more detail below.

The module is further arranged to supply, e.g. by sending, to a control system of the vehicle said at least one reference value on which the vehicle is then regulated.

The module and/or the calculation unit comprise at least a processor and a memory unit which are adapted to making all the calculations, predictions and comparisons of the method according to the invention. Processor means here a processor or microcomputer, e.g. a circuit for digital signal processing (digital signal processor, DSP), or a circuit with a predetermined specific function (application integrated specific circuit, ASIC). The calculation unit is connected to a memory unit which provides it with, for example, the stored programme code and/or stored data which the calculation unit needs to enable it to do calculations. The calculation unit is also adapted to storing partial or final results of calculations in the memory unit.

The method for control of vehicle speed according to the present invention and its various embodiments may also be implemented in a computer programme which, when executed in a computer, e.g. the aforesaid processor, causes the computer to apply the method. The computer programme usually takes the form of a computer programme product stored on a digital storage medium, and is contained in a computer programme product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 2:
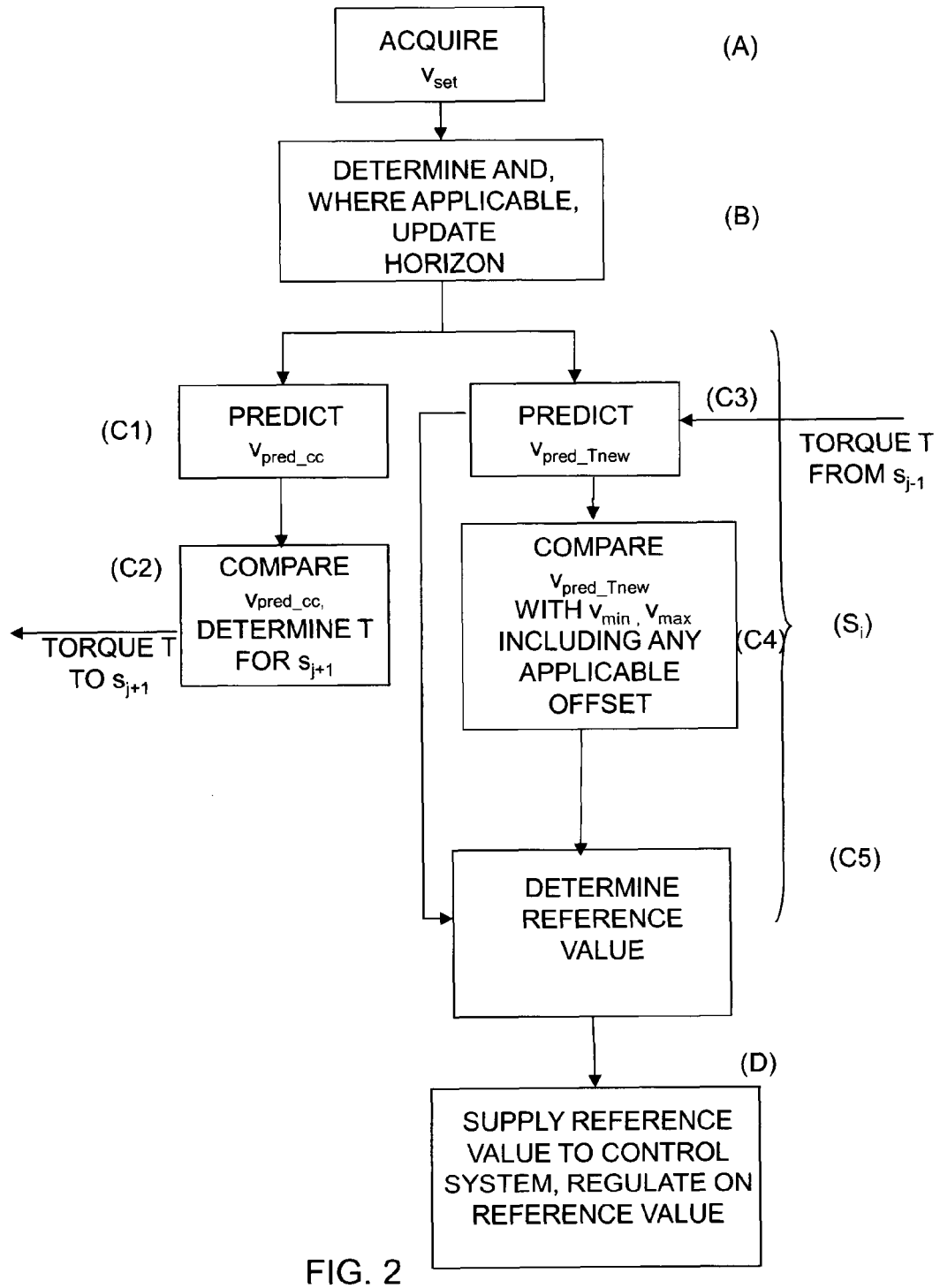
FIG. 2 is a flowchart for the method according to the invention.

FIG. 2 is a flowchart for a method for controlling the vehicle's speed according to an embodiment of the invention. The method comprises a first step A) of acquiring $v_{set}$ as a desired set speed for the vehicle to maintain. As a second step B) a horizon for the itinerary is determined by means of map data and location data which comprise route segments with at least one characteristic for each segment.

According to the method, a number of simulation cycles are then done along the length of the horizon. A simulation cycle $s_j$ comprises a number N of simulation steps conducted at a predetermined rate f, and the following steps are performed during a simulation cycle $s_j$:

C1) Making a first prediction of the vehicle's speed $v_{pred\_cc}$ along the horizon according to a conventional cruise control when the desired speed $v_{set}$ is imparted as a reference speed $v_{ref}$, which first prediction depends on the characteristics of said route segment.

C2) Doing a first comparison of the first predicted vehicle speed $v_{pred\_cc}$ with first lower and upper limit values $v_{lim1}$ and $v_{lim2}$ which are used to define an engine torque T for use in the next simulation cycle $s_{j+1}$.

C3) Making a second prediction of the vehicle's speed $v_{pred\_Tnew}$ along the horizon when the vehicle's engine torque T depends on the result of said first comparison in the immediately preceding simulation cycle $s_{j-1}$. During a simulation cycle $s_j$ the prediction according to C1) and the prediction according to C3) are thus made in parallel as illustrated in FIG. 2. The result of the first comparison of the first predicted vehicle speed $v_{pred\_acc}$ with first lower and upper limit values $v_{lim1}$ and $v_{lim2}$ in the immediately preceding simulation cycle $s_{j-1}$ determines the torque T to be used in making the second prediction of the vehicle's speed $v_{pred\_Tnew}$ during this simulation cycle $s_j$.

C4) Doing a second comparison of the second predicted vehicle speed $v_{pred\_Tnew}$ with the second lower and upper limit values $v_{min}$ and $v_{max}$ determined at step B) which delineate a range within which the vehicle's speed should be and preferably also within which the set speed $v_{set}$ has to be. According to the present invention, an offset $v_{offset}$ is here added to at least one of said second lower and upper limit values $v_{min}$ and $v_{max}$ if the vehicle is in a route segment which comprises a steep hill.

C5) determining at least one reference value which indicates how the vehicle's speed is to be influenced, on the basis of said second comparison and/or the second predicted vehicle speed $v_{pred\_Tnew}$ in this simulation cycle $s_j$.

As a further step D) said at least one reference value is then supplied, e.g. by being sent via a CAN bus, to a control system of the vehicle in which it is then used to regulate the vehicle's speed according to said at least one reference value.

When the vehicle is travelling along the road, the control system is provided with reference values on which it then regulates the vehicle. According to the invention, when the vehicle's speed is in a route segment which comprises a steep uphill or downhill run, an offset $v_{offset}$ is added in a step C5) to at least one of said lower and upper limit values $v_{min}$ and $v_{max}$. The vehicle is thereafter regulated on the reference speed $v_{ref}$ at step D) until the end of the steep uphill or downhill run. A reference speed $v_{ref}$ is then again taken from the predicted internal horizon. It is thus possible to compensate for the fact that the cruise control logic is situated in some other control system than the EMS, either by having a large regulating error at the beginning of the uphill run or by having a small regulating error on the downhill run. Applying the invention makes it possible to have a maximum engine torque on steep climbs and to ensure that the vehicle needs only a very small amount of braking on downhill runs.

An embodiment of the invention only allows an offset on the second lower and upper limit values $v_{min}$ and $v_{max}$ when the vehicle's current speed is already outside the range bounded by them.

An example of this is where the vehicle loses speed on an uphill run and is approaching a downhill run. A negative offset on $v_{min}$ is then allowed so that the vehicle can temporarily maintain a lower speed than $v_{min}$ on the downhill run when $v_{pred\_Tnew}$ indicates that it will accelerate over the set speed $v_{set}$ because of gravitation downhill.

An example of a typical value for the offset $v_{offset}$ is 5 km/h, but any other suitable values may be employed if they achieve the object of the invention.

According to an embodiment of the invention, the offset $v_{offset}$ has a positive value when the vehicle is in a route segment which comprises a steep upgrade. According to this embodiment, a positive offset is added to said lower and/or upper limit values $v_{min}$ and $v_{max}$ when the vehicle is on a steep uphill run. The reference speed $v_{ref}$ supplied to the vehicle's control system is therefore taken as the reference speed $v_{ref}$ calculated by the control system on the basis of said lower and/or upper limit values $v_{min}$ and $v_{max}$ plus the offset $v_{offset}$, i.e. $v_{min}+v_{offset}$ and $v_{max}+v_{offset}$, when the vehicle is on a steep uphill run. Maximum engine torque is thus assured on steep climbs.

According to an embodiment of the present invention, the offset $v_{offset}$ has a negative value when the vehicle is in a route segment which comprises a steep downgrade. In a similar way to on steep upgrades, when the vehicle is on a steep downgrade a negative offset $v_{offset}$ is therefore added to said lower and/or upper limit values $v_{min}$ and $v_{max}$. The reference speed $v_{ref}$ with which the vehicle's control system is supplied is then taken as the reference speed $v_{ref}$ calculated by the control system on the basis of said lower and/or upper limit values $v_{min}$ and $v_{max}$ plus $-|v_{offset}|$, i.e. $v_{min}-|v_{offset}|$ and $v_{max}-|v_{offset}|$, when the vehicle is on a steep downhill run. This provides assurance of zero torque or drag torque on steep downgrades to avoid having to brake downhill.

According to an embodiment, the value of the offset $v_{offset}$ is variable over time in order to be able to meet performance and comfort criteria which vary over time. For example, the offset $v_{offset}$ may be reduced (ramped down) towards zero at the end of a steep climb in order to avoid jerking due to rapid changes in the reference speed $v_{ref}$. Similarly, the offset $v_{offset}$ may be reduced (ramped down) towards zero at the end of a steep downhill run.

According to the invention, to avoid consuming unnecessary amounts of fuel when a first steep upgrade or a first steep downgrade is followed by a steep upgrade or a steep downgrade within a certain distance L, neither acceleration nor retardation of the vehicle are allowed within section L.

In other words, only one out of acceleration and retardation is allowed within section L in cases where L defines the distance between a steep upgrade and a subsequent steep downgrade. Similarly, only one out of acceleration and retardation is allowed within section L in cases where L defines the distance between a steep downgrade and a subsequent steep upgrade.

According to an embodiment, the length of section L depends on the vehicle's speed and/or a driving mode applied. For example, a mode chosen by the driver may decide the length of section L and consequently also how the vehicle's speed is to be regulated.

Figure 3:
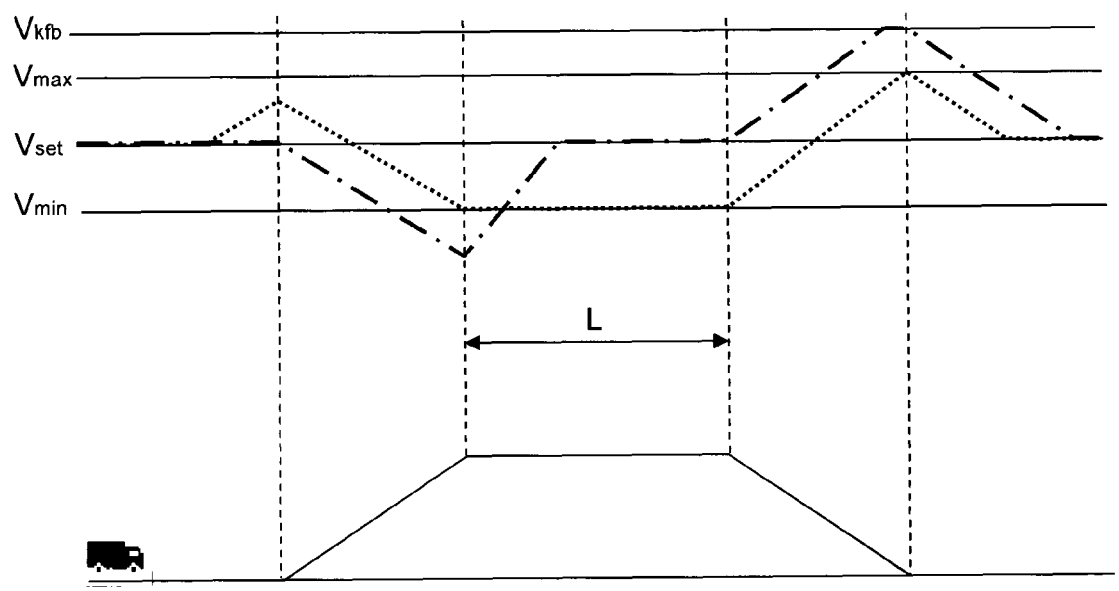
FIG. 3 illustrates the difference between the invention and a traditional cruise control according to an embodiment of the invention.
Figure 4:
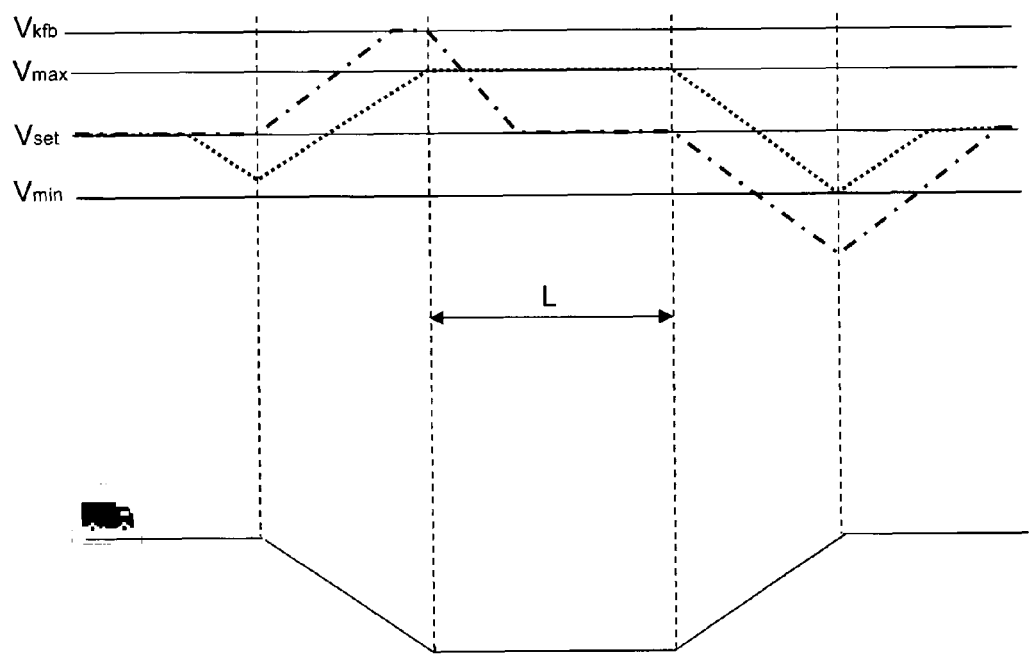
FIG. 4 illustrates the difference between the invention and a traditional cruise control according to an embodiment of the invention.

Thus according to these embodiments, only one out of acceleration and retardation takes place before the next hill. FIGS. 3 and 4 illustrate schematically a non-limitative example of these embodiments.

A conventional cruise control is represented by a chain-dotted line, and cruise control according to these embodiments of the invention by a dotted line. Section L is here specified as having a certain length which is less than a predetermined threshold value. According to an embodiment, the threshold value here is 250-500 m. Section L may for example be determined by adding up the lengths of the route segments situated between the hills.

When the vehicle has climbed the hill in FIG. 3, the reference speed $v_{ref}$ is taken as equal to the second lower limit value $v_{min}$ before the next hill. This speed $v_{min}$ is then maintained throughout section L, i.e. until the vehicle is on, for example, a steep downgrade. This avoids increasing the speed of the vehicle, which is what a conventional cruise control would do, since the vehicle would then endeavour to maintain the set speed $v_{set}$ before subsequently lowering its speed again in order to be able to take advantage of the energy accruing on the downhill run. Downhill braking of the vehicle may thus be avoided.

When the vehicle runs with conventional cruise control (chain-dotted line) more energy will have to be braked away downhill, as illustrated in the diagram, in which $v_{kfb}$ represents the retarder speed brake's speed setting (constant speed brake speed). The vehicle's constant speed brake therefore acts when this speed is exceeded.

Similarly, energy is saved by maintaining a constant speed on section L as illustrated in FIG. 4. When the vehicle has traveled down the hill in FIG. 4, the reference speed $v_{ref}$ is taken as equal to the second upper limit value $v_{max}$ before the next climb. This speed is then maintained throughout section L, i.e. until the vehicle is on, for example, a steep upgrade. This avoids its speed dropping before the climb, which is what would happen with a conventional cruise control, since the vehicle would then endeavour to maintain the set speed $v_{set}$.

The invention comprises also the aforesaid module for determination of reference values for a vehicle's control system as illustrated in FIG. 1. This module is arranged to perform all the method steps described above for the various embodiments of the invention. The invention thus proposes a module which can be used in a vehicle to regulate reference values robustly and safely where the module is in some other ECU than the vehicle's ECU, i.e. EMS. The module may be part of a control system whose reference values/set-point values it is intended to regulate, or be a freestanding module separate from the control system.

According to an embodiment of the invention, threshold values which are used by the invention, e.g. the aforesaid threshold values for section L, are determined in the calculation unit on the basis of vehicle-specific values, e.g. current transmission ratio, current vehicle weight, maximum torque curve, mechanical friction and/or the vehicle's running resistance at current speed. Threshold values used by the present invention may also be determined at least partly on the basis of choice of driving mode by the vehicle's driver. Thus they may be determined on the basis of the vehicle's state at the time and/or on the basis of driving mode choice by the driver. Necessary signals for determining these values may be obtained from CAN or be monitored by means of any appropriate sensors.

According to an embodiment, the characteristics of route segments comprise their length and gradient, and the calculation unit is adapted to calculating gradient threshold values $l_{min}$ and $l_{max}$. Thus the vehicle's speed can be regulated on the undulations of the road ahead in order to travel in a fuel-economizing way.

The horizon unit is preferably adapted to determining the horizon continuously along a planned itinerary for the vehicle on which the calculation unit is adapted to continuously performing steps to calculate and update reference values for the control system for the whole length of the internal horizon. In an embodiment, the horizon is therefore constructed bit by bit as the vehicle travels along the itinerary. The set-point values/reference values for the control system are calculated and updated continuously irrespective of whether new route segments are added or not, since the references to be calculated depend also on how values specific to the vehicle change along the itinerary.

The present invention is not restricted to the embodiments described above. Various alternatives, modifications and equivalents may be used. The aforesaid embodiments therefore do not limit the invention's protective scope which is defined by the attached claims.

The invention claimed is:

1. A method for determination of at least one reference value for a control system of a vehicle, the method comprising:
acquiring a set speed $v_{set}$ for the vehicle;
determining a horizon for the itinerary by reference to map data and location data, which horizon comprises one or more route segments, each route segment having at least one route characteristic;
performing, by a module including an automated processor, a number of simulation cycles, wherein each simulation cycle $s_j$ includes a number N of simulation steps conducted at a predetermined rate f, the simulation steps comprising:
making a first prediction of the speed $v_{pred\_cc}$ of the vehicle along the horizon according to a conventional cruise control when the set speed $v_{set}$ is imparted as a reference speed $v_{ref}$, wherein the first prediction depends on the route characteristic of said route segment;
comparing, as a first comparison, the first predicted vehicle speed $v_{pred\_cc}$ with at least one of first lower and upper limit values $v_{lim1}$ and $v_{lim2}$, wherein the first lower and upper limit values $v_{lim1}$ and $v_{lim2}$ define an engine torque T for use in an immediately following simulation cycle $s_{j+1}$;
making a second prediction of the speed $v_{pred\_Tnew}$ of the vehicle along the horizon when the engine torque T is a value which depends on the result of said first comparison in an immediately preceding simulation cycle $s_{j-1}$;
comparing, as a second comparison, the second predicted vehicle speed $v_{pred\_Tnew}$ with at least one of second lower and upper limit values $v_{min}$ and $v_{max}$, wherein the second lower and upper limit values $v_{min}$ and $v_{max}$ delineate a range within which the speed of the vehicle is maintained, and adding an offset $v_{offset}$ to at least one of said second lower and upper limit values $v_{min}$ and $v_{max}$ when the at least one route characteristic of the route segment in which the vehicle is located indicates a steep hill;

determining the at least one reference value along the horizon based on the said second comparison and/or the second predicted vehicle speed $v_{pred\_Tnew}$ in this simulation cycle $s_j$; and controlling, by the control system of the vehicle, the speed of the vehicle according to the at least one reference value.

2. A method according to claim 1, wherein said offset $v_{offset}$ is positive when the vehicle is in a route segment with a route characteristic indicating a steep upgrade.

3. A method according to claim 1, wherein said offset $v_{offset}$ is negative when the vehicle is in a route segment with a route characteristic indicating a steep downgrade.

4. A method according to claim 1, wherein the value of said offset $v_{offset}$ varies over time.

5. A method according to claim 1, wherein the value of said offset $v_{aset}$ is at least partly based on a driving mode applied by the vehicle.

6. A method according to claim 5, wherein said driving mode is chosen by a driver of the vehicle.

7. A method according to claim 1, wherein only one out of acceleration and retardation is allowed within a section L where a steep upgrade is followed by a steep downgrade within the length of section L from said steep upgrade.

8. A method according to claim 1, wherein only one out of acceleration and retardation is allowed within a section L where a steep downgrade is followed by a steep upgrade within the length of section L from said steep downgrade.

9. A method according to claim 7, wherein the length of section L depends on
the speed of the vehicle, and/or
a driving mode applied.

10. A method according to claim 1, wherein an offset on the respective second lower and upper limit values $v_{min}$ and $v_{max}$ is allowed when the current speed of the vehicle is outside the range bounded by the second lower and upper limit values $v_{min}$ and $v_{max}$ and when the second prediction $v_{pred\_Tnew}$ of the speed of the vehicle indicates that the set speed $v_{set}$ will be reached by imparting the reference value which resulted in the second prediction $v_{pred\_Tnew}$ of the speed of the vehicle.

11. A non-transitory computer-readable medium product incorporating instructions for enabling a computer of a vehicle to perform steps according to the method of claim 1 when the instructions are run on said computer.

12. A module configured to control a speed of a vehicle, the module comprising:

an input unit configured to receive a set speed $v_{set}$ for the vehicle;

a horizon unit configured to determine a horizon for an itinerary of the vehicle, by reference to map data and location data which comprise route segments, each route segment having at least one route characteristic;

a calculation unit configured to perform a number of simulation cycles, wherein each simulation cycle $s_j$ comprises a number N of simulation steps conducted at a predetermined rate f, the simulation steps comprising:

making a first prediction of the speed $v_{pred\_cc}$ of the vehicle along the horizon according to a conventional cruise control when the set speed $v_{set}$ is imparted as a reference speed $v_{ref}$, which first prediction depends on the at least one route characteristic of said route segment;

comparing, as a first comparison, the first predicted vehicle speed $v_{pred\_cc}$ with at least one of first lower and upper limit values $v_{lim1}$ and $v_{lim2}$, wherein the first lower and upper limit values $v_{lim1}$ and $v_{lim2}$ define an engine torque T for use in an immediately following simulation cycle $s_{j+1}$;

making a second prediction of the speed $V_{pred\_Tnew}$ of the vehicle along the horizon when the engine torque T is a value which depends on a result of said first comparison in an immediately preceding simulation cycle $s_{j-1}$;

comparing, as a second comparison, the second predicted vehicle speed $V_{pred\_Tnew}$ with at least one of second lower and upper limit values $v_{min}$ and $v_{max}$, wherein the second lower and upper limit values $v_{min}$ and $v_{max}$ delineate a range within which the speed of the vehicle is maintained, and adding an offset $v_{offset}$ to at least one of said second lower and upper limit values $v_{min}$ and $v_{max}$ when the vehicle is in a route segment with a route characteristic indicating a steep hill; and determining the at least one reference value along the horizon based on the second comparison and/or the second predicted vehicle speed $V_{pred\_Tnew}$ in this simulation cycle $s_j$; and a providing unit configured to supply a control system of the vehicle with the at least one reference value for regulating the speed of the vehicle.

13. A module according to claim 12, wherein said offset $v_{offset}$ is positive when the vehicle is in a route segment with a route characteristic indicating a steep upgrade.

14. A module according to claim 12, wherein said offset $v_{offset}$ is negative when the vehicle is in a route segment with a route characteristic indicating a steep downgrade.

15. A module according to claim 12, wherein the value of said offset $v_{offset}$ varies over time.

16. A module according to claim 12, wherein the value of said offset $v_{offset}$ is at least partly based on a driving mode applied by the vehicle.

17. A module according to claim 16, wherein said driving mode is chosen by a driver of the vehicle.

18. A module according to claim 12, wherein the calculation unit is configured to allow only one of acceleration and retardation within a section L where a steep upgrade is followed by a steep downgrade within the length of section L from said steep upgrade.

19. A module according to claim 12, wherein the calculation unit is configured to allow only one of acceleration and retardation within a section L where a steep downgrade is followed by a steep upgrade within the length of section L from said steep downgrade.

20. A module according to claim 18, wherein the length of section L depends on
the vehicle's speed, and/or
a driving mode applied.

21. A module according to claim 12, wherein the calculation unit is configured to determine threshold values used to control the speed of the vehicle, based on at least one from among a current transmission ratio, a current vehicle weight, a maximum torque curve for the engine of the vehicle, a mechanical friction, and a running resistance at current speed of the vehicle.

22. A module according to claim 12, wherein the calculation unit is configured to calculate threshold values in the form of gradient threshold values $l_{min}$ and $l_{max}$.

23. A module according to claim 12, wherein an offset on the respective second lower and upper limit values $v_{min}$ and $v_{max}$ is allowed when the current speed of the vehicle is outside the range bounded by the second lower and upper limit values $v_{min}$ and $v_{max}$, and when the second prediction $V_{pred\_Tnew}$ of the speed of the vehicle indicates that the set speed $v_{set}$ will be reached by imparting the reference value which resulted in the second prediction $V_{pred\_Tnew}$ of the speed of the vehicle.

24. A vehicle comprising the module of claim 12.

\* \* \* \* \*